United States Patent [19]

Edler et al.

[11] Patent Number: 5,405,592

[45] Date of Patent: Apr. 11, 1995

[54] NON-DENSIFIED SILICON NITRIDE BETA-PHASE MATERIAL

[75] Inventors: James P. Edler; Bohdan Lisowsky, both of Troy, Mich.

[73] Assignee: Eaton Corporation, Cleveland, Ohio

[21] Appl. No.: 963,534

[22] Filed: Oct. 20, 1992

Related U.S. Application Data

[63] Continuation-in-part of Ser. No. 557,582, Jul. 24, 1990, Pat. No. 5,156,830.

[51] Int. Cl.⁶ .................... C01B 21/06; C04B 35/58
[52] U.S. Cl. ........................................ 423/344; 501/97
[58] Field of Search ............... 423/344, 406; 264/65, 264/66; 501/97, 154

[56] References Cited

U.S. PATENT DOCUMENTS

| | | | |
|---|---|---|---|
| 3,950,464 | 4/1976 | Masaki | 264/65 |
| 4,354,990 | 10/1982 | Martinengo et al. | 264/65 |
| 4,492,665 | 1/1985 | Pompe | 264/65 |
| 4,888,142 | 12/1989 | Hayashi et al. | 264/65 |
| 4,919,689 | 4/1990 | Pyzik et al. | 51/309 |
| 4,943,401 | 7/1990 | Edler et al. | 264/63 |
| 5,002,907 | 3/1991 | Hayakawa et al. | 501/97 |
| 5,114,693 | 5/1992 | Hintermayer et al. | 423/344 |
| 5,156,830 | 10/1992 | Edler et al. | 423/344 |

OTHER PUBLICATIONS

Paul Jahn, "Processing of Reaction Bonded Silicon Nitride", High Temperature Processing Equipment for Advanced Ceramics Symposium, Boston, Mass., Oct. 19-20, 1989, pp. 1-27.

Williams et al., "Slip Casting of Silicon Shapes and Their Nitriding", Ceramic Bulletin, vol. 62, No. 5 (1983) pp. 607-619.

Moulson, A. J. "Review: RBSN–It's Formation and Properties" J. Mat. Sci. 14 (1979) 1017–1051.

*Primary Examiner*—Olik Chaudhuri
*Assistant Examiner*—Ken Horton
*Attorney, Agent, or Firm*—Paul S. Rulon; Lynn E. Cargill

[57] ABSTRACT

A silicon-nitride beta-phase material including a non-densified structure of beta silicon nitride crystals having appreciable strength without any significant amount of liquid forming agents is made by comminuting a slurry including a mixture of silicon powder and water to form non-oxidized surfaces on the silicon powder and to allow chemical reaction between the silicon and the water, reducing the water content of the reacted slurry to a degree sufficient to form a resultant dry mass, nitriding the dry mass by exposure to a nitriding gas including at least nitrogen to form a mass of alpha-phase silicon nitride, and converting the resultant silicon nitride mass at a conversion temperature of from about 1450° C. to about 2100° C. to convert the silicon nitride from an alpha-phase material to a non-densified beta phase silicon nitride material.

21 Claims, 2 Drawing Sheets

NON-DENSIFIED SILICON NITRIDE BETA-PHASE MATERIAL

This is a continuation-in-part of application Ser. No. 557,582 filed on Jul. 24, 1990, now U.S. Pat. No. 5,156,830.

TECHNICAL FIELD

This invention relates to silicon nitride beta-phase materials. This application also relates to applications which were co-pending with the parent application entitled Process For Making Silicon Nitride Articles; Process For Preparing A Nitridable Silicon-Containing Material Having At Least One Densification Aid Including Alumina, And The Material Resulting Therefrom; New Ceramic Phase In Sintered Silicon Nitride Containing Cerium, Aluminum, And Iron; Process For Preparing A Densified Beta-Phase Silicon Nitride Material Having At Least One Densification Aid, And The Material Resulting Therefrom; Process For Nitriding Silicon-Containing Materials; and Process For Preparing A Base Nitridable Silicon-Containing Material And The Material Resulting Therefrom, filed on the same day herewith, the same are also incorporated herein by reference.

BACKGROUND OF THE INVENTION

Alpha-phase silicon nitride material has been made in a variety of ways, most of them expensive, time and labor intensive. It is desirable to produce a high alpha-phase content silicon nitride from an inexpensive starting material in order to be later processed into various products. For some applications, such as refractory products, it is advantageous to convert the alpha-phase silicon nitride material to beta-phase silicon nitride material. Beta-phase material may either be in the form of densified or non-densified silicon nitride. To densify silicon nitride material, there generally is a requirement for the inclusion of densification aids, or liquid forming agents. To form non-densified beta-phase, densifying agents would be present in the alpha-phase silicon nitride body, however the body would not be heated to a sufficient temperature for a sufficient time to cause complete densification.

Heat treatment of the alpha silicon nitride above 1450° C. can result in either densified or non-densified beta-phase material. In order for the alpha-phase material to be sintered and converted into densified beta-phase material, either densification aids or liquid forming agents must be included in the alpha-silicon nitride body before the sintering temperature is reached and maintained for a sufficiently long time to sinter the material. The presence of liquid forming agents in silicon nitride bodies are well known to decrease their high temperature strength. There are some applications, particularly as refractories, for which a beta-phase material without liquid forming agents would be desirable.

Densification of silicon nitride occurs by the transformation of the alpha phase of silicon nitride into the beta phase of silicon nitride in the presence of a high temperature liquid phase, accompanied by about a 10–12 percent reduction in volume. The liquid phase promotes the conversion of the alpha-phase silicon nitride to the densified beta phase silicon nitride during sintering or densification. It has been found that densification does not generally occur without liquid forming agents.

In the past there has been a major problem associated with the processing of reaction bonded silicon nitride which is the extensive time required for preparation and nitridation of the silicon powder. Typically, in order to manufacture a reaction bonded silicon nitride, very pure silicon has been ground and mixed dry with sintering aids for long periods of time, upwards of 48 hours, and then nitrided for long times, on the order of hundreds of hours to weeks. Total fabrication times of 200 to 400 hours are not uncommon.

Reaction bonded silicon nitride is commonly prepared by reacting and nitriding the silicon (either as a powder or as a formed article) with nitrogen by exposing the silicon to a nitrogen-containing atmosphere at temperatures of 1100° C. to about 1420° C. for times sufficient to produce the silicon nitride. It is not uncommon for the nitriding time in prior art methods to be 100°–200 hours. It is normal for a small amount of nitriding aid (e.g., iron oxide or nickel oxide) to be initially mixed with the silicon powder to enhance the nitridation of the silicon during the nitriding step.

U.S. Pat. No. 4,285,895 to Mangels et al. teaches that sintered reaction bonded silicon nitride articles can be made by incorporation of a densification aid into the reaction bonded silicon nitride article, surrounding the article with a packing powder of silicon nitride and densification aid and subjecting the article and powder mixture to a temperature above 1700° C. with a nitrogen atmosphere of sufficient pressure to prevent volatilization of the silicon nitride for a time sufficient to permit sintering of the reaction bonded silicon nitride articles.

Several methods for introducing the densification aid into the reaction bonded silicon nitride article are disclosed in the above referenced Mangels et al. patent. These include (1) the impregnation of the densification aid into the reaction bonded silicon nitride article; (2) incorporation of the densification aid into the cover powder and then relying upon diffusion of that densification aid into the article the sintering temperature; and (3) incorporation of the densification aid into the silicon powder mix prior to nitriding. The densification aids cited are magnesium oxide, yttrium oxide, cerium oxide, and zirconium oxide. The Mangels et al. patent also teaches that the nitrogen pressure at the sintering temperature may be in the range of 250 to 1500 psi.

U.S. Pat. No. 4,351,787 to Martinengo et al. teaches that sintered silicon nitride articles can be prepared by forming a silicon powder mixture containing one or more sintering additives into a compact, the additives being present in the powder in an amount such as to ensure an additive content of from 0.5 to 20wt % in the silicon nitride compact; heating the compact under a nitrogen gas blanket at a temperature not exceeding 1500° C. to convert the silicon into reaction bonded silicon nitride; and sintering the reaction bonded silicon nitride compact by heating in a nitrogen gas atmosphere at a temperature of at least 1500° C. Furthermore, it is taught that the silicon powder size is from 0.1 to 44 microns in size and of high purity or containing only very small amounts of nitriding catalysts. The Martinengo et al. patent teaches that any conventional sintering additive may be used. Best results are said to be achieved by using MgO, and especially in combination with $Y_2O_3$. Other preferred additives mentioned in the patent are MgO, $Y_2O_3$, $CeO_2$, $ZrO_2$, BeO, $Mg_3N_2$, and AlN. Other examples of additives are given as $Mg_2Si$, $MgAl_2O_4$, and rare earth additions such as $La_2O_3$. Also iron can be used with advantage, usually in mixture with conventional additives such as MgO, $Y_2O_3$, and $CeO_2$.

As a final example of sintered reaction bonded silicon nitride practice, reference is made to U.S. Pat. No. 4,443,394 to Ezis which teaches a method for making a fully densified silicon nitride body. The basic principle taught is that silicon nitride will not sinter by itself, but requires a liquid phase at the sintering temperature. Ezis found that, by having an yttrium oxynitride and alumino-silicate liquid phase present at sintering temperatures of 1650°–1750° C., the need for an over pressure of nitrogen and cover or packing powder during sintering could be eliminated in order to densify the silicon nitride.

The Ezis patent teaches that, by (1) forming a nitridable mixture of: silicon powder, $SiO_2$ (carried with the Si metal), $Y_2O_3$ and $Al_2O_3$; (2) nitriding the mixture to form a reaction bonded silicon nitride, with consequent formation of a $Y_{10}Si_6O_{24}N_2$ phase, and an alumino-silicate which resides on the silicon nitride grains; and then (3) sintering in the 1650 to 1750° C. temperature range for 5–12 hours, a substantially fully densified silicon nitride is produced which exhibits a 4-point bending strength of 100,000 psi at room temperature.

The Ezis patent further teaches the need for a long ball milling time of 48 hours, preferably dry, a nitridation cycle time of 200 hours, and sintering times of 5–12 hours. Total processing time including the milling can be estimated from the preferred embodiment as approximately 260 hours.

It is known that the presence of significant amounts of liquid forming agents in silicon nitride will reduce the high temperature strength of the body. When a temperature is reached such that the liquid forming agents begin to soften, or turn liquid then they act as internal lubricants and significantly reduce the strength of the silicon nitride. Generally silicon nitrides show a gradual decrease in strength with increasing temperature until a specific temperature is reached wherein a drastic decrease in strength occurs over a narrow additional temperature increase. A silicon nitride without significant amounts of liquid forming agent would not be expected to show this sudden decrease in strength, but would rather show a gradual, or small decrease in its strength with increasing temperature. For instance a change in hot flexure strength of 10,000 pounds per square inch or more over about a 100° C. increment in test temperature would constitute a drastic change in strength. Likewise it is expected that the liquid forming agents present in amounts greater than 1-2 volume percent of the silicon nitride would be considered significant amounts of liquid forming agents.

It is a primary object of the present invention to provide an inexpensive material which is stable at high temperatures and may be used as a refractory material.

It is, therefore, a primary object of the present invention to provide a body of non-densified beta-phase material.

SUMMARY OF THE INVENTION

In accordance with the preferred embodiment of the invention, this and other objects and advantages are addressed as follows. A silicon nitride beta-phase material is disclosed which includes a non-densified structure of beta silicon nitride crystals having appreciable strength without any significant amounts of liquid forming agents. The non-densified beta-phase material is disclosed which is formed from readily available silicon-containing powders which are first reacted to form alpha-phase silicon nitride and then converted by use of a high temperature heat treatment into non-densified beta-phase silicon nitride.

A method for preparing such a non-densified beta-phase material includes comminuting a homogeneous slurry including a mixture of silicon powder and water. The comminuting is performed to form non-oxidized surfaces on the silicon powder and to allow substantial chemical reaction between the silicon and the water. A dispersing agent such as Darvan No. 1 or 6, a registered trademark of the R. T. Vanderbilt Company, Inc. may be added initially to aid the comminution. Comminution of the operative chemical compounds with water is conducted for a period of 1 to 5 hours, to produce a silicon based slurry. Thereafter, the water content of the reacted slurry is reduced to a degree sufficient to form a nitridable dry mass.

Organic additives such as binders, plasticizers, viscosity modifiers, and dispersing agents may be added to the slurry toward the end of the comminution. The slurry may then be aged for a period of 12 to 24 hours to allow the reaction of the silicon with the water to substantially reach completion which is believed to provide a silicon oxyhydride coating on the silicon. The aged slurry is then dried by spray drying or any other suitable technique and formed into a green body, if desired, such as by compaction of the spray-dried granules. Slip casting of the original slip, extrusion, injection molding or any other known method for forming green ceramic bodies may likewise be employed. Thereafter, nitriding the dry mass is accomplished by exposure to a nitriding gas, including at least nitrogen gas, to form a mass of silicon material which is predominantly in the alpha-phase. Then, the resultant non-densified beta-phase silicon nitride material is made by converting the resultant silicon nitride mass at a conversion temperature of from about 1450° C. to about 2100° C. for a sufficient length of time to convert the silicon nitride from a the alpha-phase material to a non-densified beta-phase silicon nitride material.

BRIEF DESCRIPTION OF THE DRAWINGS

The nature and extent of the present invention will be clear from the following detailed description of the particular embodiments thereof, taken in conjunction with the appendant drawings, in which.

DETAILED DESCRIPTION OF THE INVENTION

Figure 1:
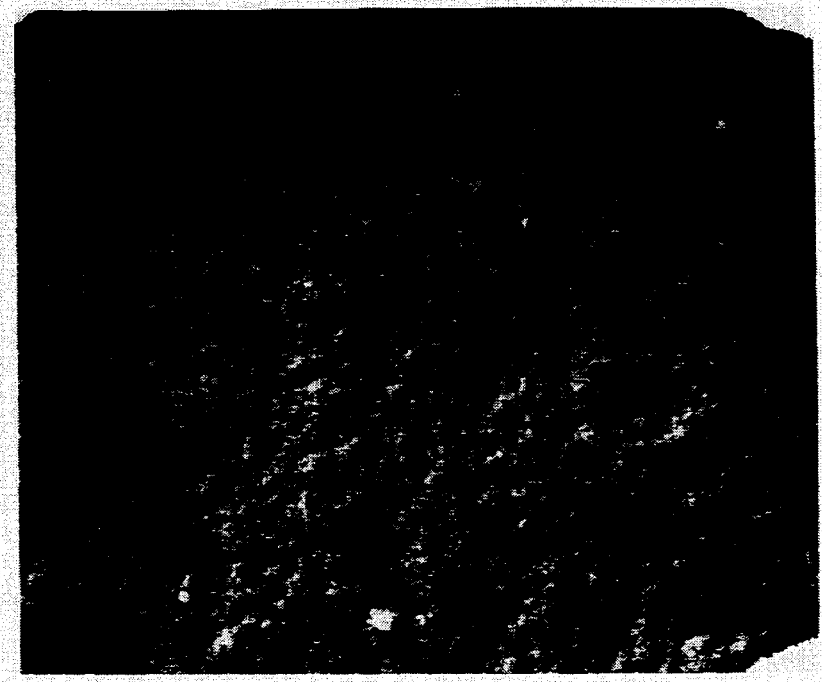
FIG. 1 is a photograph of a scanning electron microscopy (SEM) image of a fractured surface of the non-densified beta-phase silicon nitride of this invention at a magnification of 100×.

The silicon nitride beta-phase material may be made in the form of a powder or an article. The process for making the material includes comminuting a slurry including a mixture of silicon powder or a silicon-containing material such as silicon powder with silicon nitride or other grog, and water, the comminuting being performed to form non-oxidized surfaces on the silicon powder and to allow substantial chemical reaction between the silicon powder and the water, reducing the water content of the reacted slurry to a degree sufficient to form a nitridable mass, nitriding the dry mass by exposure to a nitriding gas including at least nitrogen to form a mass of silicon nitride material which is predominantly in the alpha-phase, and heating the resulting silicon nitride mass at a conversion temperature of from about 1450° C. to about 2100° C. to convert the silicon nitride from the alpha-phase material to a non-densified beta-phase silicon nitride material.

In addition, at least one nitriding agent may be added at about 0.5 to 7 volume percent based upon the volume of the resultant dry mass to aid in any later nitriding process. The at least one nitriding agent may be selected from the group consisting of iron oxides, lead oxides, nickel carbonyl, nickel oxides, silicon carbide, graphite, carbon, aluminum oxides, $Fe_2O_3$, NiO, CoO, CaF, PbO, $Li_2O$, $Na_2O$, $K_2O$, BaO, BN, albite ($NaAlSi_3O_8$), orthclase ($KAlSi_3O_8$), anorthite ($CaAl_2Si_2O_8$), nepheline syenite, talc, borax, soda ash, $Pb_3O_4$, alpha-phase $Si_3N_4$ and mixtures thereof. The nitriding agent should not be used at such a level so as to densify the resulting beta-phase silicon nitride.

The process relating to making of silicon nitride powders and bodies of this invention generally begins with comminuting silicon powder in the presence of a large amount of water to form a slurry. The slurry components are employed in amounts such that the mixture consists of 10–60 volume % solids and 90 to 40 volume % water, wherein the solids consist of silicon powder, nitriding agents, and any other solids which may have been added. The silicon powder may be commercial-grade and preferably has a particle size of less than 20 micrometers. The comminuting is performed by ball milling, preferably for greater than two hours, until the silicon powder size is predominantly less than 10 microns. A dispersing aid may also be added into the slurry in the comminuting step to aid the comminution process. In addition, admixing organic additives to the slurry before substantially reducing its water content may effect the physical properties of the silicon mixture, or of resulting products. These organic additives may be selected from the group consisting of binders, lubricants, plasticizers, and viscosity modifiers including dispersing agents. The admixing may be accomplished by comminuting the slurry with the organic additives for at least 30 minutes after the organic additives are admixed. Evolving gases should be continuously or periodically vented from the reacting slurry to avoid explosion.

For comminuting, any suitable comminution device may be used such as a ball mill, rod mill, vibratory grinder, attrition mill, jet mill, cone grinder, jaw crusher, and hammer mill. The slurry is preferably prepared in a ball mill which is 25–50 volume filled with milling media and 25–50 volume % filled with the slurry.

The comminuting of the silicon in the presence of water is an important step, as the comminuting creates unoxidized surfaces on the silicon powder particles for vigorous reaction with the water. Merely mixing silicon powder, whether or not pre-ground, with water does not appear to create the fast, vigorous reaction that comminuting provides. Pre-ground silicon powder is not as reactive toward water because silicon, being a highly reactive metal, readily oxidizes in air during storage. Thus, a passivating layer of silicon oxide is formed on the outside of the silicon particles, thereby rendering the silicon not nearly as reactive as unoxidized silicon such as is created during the comminution step.

After comminuting, the slurry is allowed to react further by aging the slurry in the absence of comminuting to allow the chemical reaction to be substantially completed. It is believed that the silicon is chemically reacting with the water during the aging step to form a silicon oxyhydrate coating on the silicon particles and also releasing hydrogen gas as a product of the reaction. During aging, the slip appears to increase in volume by at least 50%, typically doubling its volume through frothing, and, subsequently, the frothing subsides after about 12 hours as the reaction nears completion and the slip develops thixotropic properties.

After aging, the chemically reacted slurry could be slip cast at this point to form a green body or dried for use in dry compression forming, isopressing, extrusion or injection molding of shapes in preparation for a subsequent nitriding step. It is preferred to spray dry the slip to obtain a homogeneous free-flowing powder for isopressing or dry compression forming using standard powder metal presses. Reducing the water content may be performed by spray drying, slip casting, extrusion, injection molding, or tape casting. The resulting dry mass may be formed into an article before exposing the article to the nitriding atmosphere or isopressing, dry pressing, extruding, injection molding, or slip casting. If binders are used, the compact will have a sufficient strength to allow machining without the need for special heat treatments by partially nitriding or sintering the silicon compact. Preferably, required machining is completed on the silicon green body prior to nitriding, rather than on the harder silicon nitride part.

The powder or the compacted parts are then put into a furnace. The furnace is evacuated and preferably filled with a combustible gas atmosphere such as pure hydrogen gas. The temperature of the furnace is then increased from room temperature to about 1000° C. over about 1 to 5 hours, while flowing the combustible gas therethrough, by a nearly linear progression of increasing temperature while flowing hydrogen through the furnace at atmospheric pressure to burn off the organic additive materials without causing any substantial damage to the powder or compacted parts. The substantially nontoxic effluent which is vented includes carbon dioxide and water.

The furnace may then be purged with flowing nitrogen to obtain a noncombustible atmosphere and evacuated again to remove the nitrogen and any remaining effluent. Helium gas may be added, preferably until a pressure of 50 KPa absolute is indicated. Then a nitrogen-hydrogen gas blend consisting of 4 weight percent hydrogen and 96 weight percent nitrogen may be admitted to the furnace until the pressure is preferably slightly above atmospheric pressure (approximately 120 KPa absolute) to avoid any leakage of ambient air into the furnace. The nitriding atmosphere comprises from about 40 to about 99 mole percent nitrogen, from about 0 to about 60 mole percent helium, and from about 1 to about 5 mole percent hydrogen. The preferred resulting partial pressure in the above-described nitriding atmosphere constituents are nitrogen, helium and hydrogen at 48%, 50% and 2%, respectively.

The temperature is then preferably increased from 1000° C. to a nitriding temperature of between 1350° C. and 1450° C., preferably about 1420° C., at a linear rate of about 5° C. to 50° C./hr, although 15° C. to 25° C. per hour is preferred. During this heating cycle, nitrogen is consumed by the silicon to form silicon nitride. The nitriding atmosphere composition in the furnace atmosphere is kept substantially constant by monitored addition of substantially pure nitrogen gas into the furnace to maintain the slightly greater than atmospheric pressure. Once 1420° C. is reached, the temperature is maintained for less than 2 hours, and preferably for about 1 hour; then the heat source is shut off and the silicon nitride articles are allowed to cool. This nitriding step produces a mass of silicon nitride material which is predominantly in the alpha-phase. As discussed above, it is advantageous for the nitrided silicon to be a high alpha-phase content silicon nitride.

After the nitriding step, the next step involves converting the resultant silicon nitride mass at a conversion temperature of from about 1500° C. to about 2100° C. to convert the silicon nitride material from a predominantly alpha-phase material to a predominantly non-densified beta-phase silicon nitride material. The conversion generally includes utilizing at least a nitrogen-containing atmosphere, and more specifically may include nitrogen and helium, nitrogen and hydrogen, nitrogen, helium and hydrogen, or it may include the same atmosphere at the nitriding atmospheric gas used during the nitriding step. The conversion step may also utilize an atmosphere containing substantially pure nitrogen.

The conversion step can be conducted immediately after the nitriding by heating directly to the conversion temperature of 1450° C. to 2100° C. or the alpha-phase silicon nitride mass can be cooled to room temperature and converted at some later time by heating to the conversion temperature of 1450° C. to 2100° C. The conversion step may be performed under vacuum from the end of the nitriding step to the beginning of the conversion step, followed by an atmosphere containing at least nitrogen admitted during the duration of the converting step. In addition, the conversion step may be accomplished while utilizing the above-described conversion atmosphere at a pressure of from vacuum to about atmospheric pressure, or from atmospheric to about 150 psig, and preferably at a partial pressure of about zero psig or greater than zero psig while utilizing at least nitrogen in the conversion atmosphere. Specifically, it is preferred that the conversion step be accomplished while heating from the temperature achieved at the end of the nitriding step to the beginning of the conversion step at an increasing rate of from about 250° C. to about 1250° C. per hour until an elevated temperature of about 1450° C. to about 2100° C. is reached. The increasing rate may include from about 500° C. to about 1000° C. per hour until the elevated temperature is reached. Preferably, the increasing rate is at about 500° C. per hour until the elevated temperature is reached. The conversion step is accomplished by maintaining a temperature of between about 1450° C. to about 2100° C., and preferably between about 1650° C. to about 1850° C. until substantially all of the silicon nitride in the alpha phase is converted to non-densified beta-phase silicon nitride. This is done by maintaining the conversion temperature for about 0.3 to about 20 hours until substantially all of the conversion takes place, preferably from about 5 to about 10 hours, and most preferably between about 1 to 2 hours.

After the conversion step, a cooling down step may also be included which cools down the resulting non-densified silicon nitride mass from the conversion temperature back to room temperature at a rate of from about 250° C. to about 1250° C. per hour, preferably from about 500° C. to about 1000° C. per hour, and most preferably at about 500° C. per hour until room temperature is reached. Samples prepared by this method display excellent properties, low size distortion and high material integrity. The non-densified beta-phase silicon nitride material which results from this method has found particular utility in applications which require a stable high temperature material, e.g., refractory materials. The material of this invention also does not require sintering aids and is, therefore, economically advantageous.

Non-densified beta silicon nitride of this invention (a) typically has a density of less than about $3.2 \text{ g/cm}^3$ and, more typically, less than about $2.8 \text{ g/cm}^3$; (b) typically has an apparent porosity of at least about 1%, more typically, of from about 10 to 40%; (c) typically has a hardness of at least 100 Knoop hardness number, more typically, from about 400 to about 800 Knoop hardness number; (d) typically has a hardness of at least 20 Rockwell A Hardness, and, more typically, of at least 40 Rockwell A Hardness; and (e) typically has less than about 10 weight percent alpha-phase silicon nitride, and, more typically, less than about 5 weight percent alpha-phase silicon nitride as determined by X-ray intensities. The non-densified beta silicon nitride of this invention typically has equiaxed beta-phase silicon nitride grains from about 0.1 to about 20 microns in size, and, more typically, from about 0.5 to about 5 microns in size for at least 25%, more preferably at least 50% and, most preferably, at least 75% of the grains of the beta-phase silicon nitride. The non-densified beta-phase silicon nitride of this invention typically has pores from about 0.1 to about 50 microns in size, more typically, from about 1 to about 10 microns in size for at least 25%, more preferably, at least 50%, and, most preferably, at least 75% of the pores.

The hardness values discussed above are determined as described in the following example 3 which discusses analysis of the non-densified beta-phase silicon nitride material of this invention.

It is expected that the non-densified beta-phase material of this invention typically exhibits not more than a 10,000 pounds per square inch change in hot flexure strength over about a 100° C. increase in test temperature. Usually the non-densified beta-phase material of this invention contains less than about 2 volume percent, and, more often, less than 1 volume percent, liquid forming agents based on the volume of the silicon nitride material.

The following examples are illustrative only and should not be construed as limiting the invention which is properly delineated in the appended claims.

EXAMPLES

The following Examples 1 and 2 are prophetic examples illustrating preparation of the non-densified beta-phase silicon nitride of the invention.

Example 1

One hundred pounds of commercial-grade silicon metal (99% silicon minimum) of size 2.03 Fisher Average Diameter together with three pounds of iron oxide powder nitriding agent are comminuted with 8 gallons of distilled water. Comminution is continued for 3 hours in an alumina lined ball mill which is filled roughly to the halfway level with approximately 1 inch diameter alumina balls. The mill is vented hourly to prevent excessive pressure build-up in the mill. At the conclusion of the comminuting period, 1κ pounds of polyvinyl alcohol, ½ pound of polyethylene glycol, one pound of glycerol, and ¼ pound of xanthan gum are added to the mill and comminution is continued for an additional hour, so that the silicon metal is comminuted with the distilled water for a total time of 4 hours. The slurry is separated from the milling balls and allowed to age overnight. The aged slurry is spray-dried to a free-flowing powder using a PENTRONIX dryer with an atomizer wheel speed of 8000 rpm, and inlet temperature of 275° C. and an outlet temperature of 100° C.

The spray-dried powder is formed by isopressing into billets which are machined into kiln ware. The silicon kiln ware is then placed in a nitriding furnace, which is then evacuated to remove the ambient atmosphere. Then the furnace is backfilled with hydrogen gas, which is also flowed continuously through the furnace. The temperature of the furnace is raised from room temperature to 1000° C. over approximately a 2-hour period at a linear rate. At approximately 1000° C., the hydrogen atmosphere is first replaced by nitrogen, and then replaced by a nitriding atmosphere which consists of approximately of a mixture of 50 mole % helium, 2 mole % hydrogen, and 48 mole % nitrogen gases. The temperature is then linearly raised to 1420° C. at 15° C. per hour. Nitrogen gas is automatically added to the furnace to maintain a constant nitrogen concentration, as the nitrogen is consumed by the silicon during the conversion of the silicon to silicon nitride. The kiln ware is then cooled to room temperature.

The kiln ware then under goes an additional heat treatment to 1720° C. in nitrogen at slightly above atmospheric for four hours to cause the conversion of the alpha-phase silicon nitride to non-densified beta-phase silicon nitride. The kiln ware is then cooled to room temperature.

Example 2

Using the spray-dried powder of Example 1, modulus of rupture bars are prepared by die pressing. The modulus of rupture bars are nitrided by placing them in a furnace and increasing the temperature of the furnace linearly from room temperature to 1000° C. in 2 hours, while flowing hydrogen through the furnace.

Once the furnace temperature reaches 1000° C., the atmosphere in the furnace is replaced with a nitriding gas of 5 mole % $H_2$ and 95 mole % $N_2$. The furnace pressure being slightly above atmospheric. The furnace temperature is then, linearly, increased from 1000° C. to 1420° C. at 15° C. per hour.

The MOR bars are then heated from 1420° C. to a conversion temperature of 1730° C. at a linear rate of 300° C. per hour, and held at 1730° C. for 4 hours in the same atmosphere to cause conversion of the alpha-phase silicon nitride to non-densified beta-phase silicon nitride. The MOR bars are then allowed to cool to room temperature, and removed from the furnace.

Example 3

A sample of non-densified beta silicon nitride manufactured as described hereinabove was analyzed. This sample had been subjected to a minimum 1720° C. conversion heat treatment after nitridation. The results of this analysis are:

Density Measurements

Density measurements were made using a Mettler H10T balance accurate to 0.0001 grams. The method of ASTM C373-72 was followed with the following deviations: only a single sample was tested (not five as required in C373-72), the sample was boiled vigorously for 30 minutes and allowed to soak for approximately 20 hours in distilled water containing a very small quantity of photoflow solution used to reduce the surface tension of the water, and the sample weight prior to the test was approximately one half that required by C373-72.

Actual Measurements

Dry sample weight in air: 25.4416 gm
Suspended weight in water: 17.2942 gm
Saturated weight in air: 28.2511 gm

Calculated Values

Bulk Density: 2.3220 gm/cm$^3$
Apparent Specific Gravity: 3.1227 gm/cm$^3$
Apparent Porosity: 25 64%
Water Absorption: 11.04%

Hardness Measurements

A Wilson Instruments' Tukon Microhardness Tester No. M01007, operated with a load of 500 grams and using a standard knoop indentor, was utilized to obtain the knoop hardness numbers. Hardness readings were taken on the sample of non-densified beta silicon nitride which was mounted in a standard one inch diameter cold mount epoxy metallurgical mount and polished to a mirror finish. Indentations were made in four locations on the test sample, and the length of the indentations measured in filar units using a 20× objective. The filar measurements were converted to knoop hardness numbers, with the following results: The average filar measurement was 237 filar units, and the average hardness was 598 KHN.

| Location | Filar Units | Knoop Hardness No. |
| --- | --- | --- |
| 1) | 244 | 535 KHN |
| 2) | 189 | 894 KHN |
| 3) | 258 | 478 KHN |
| 4) | 256 | 487 KHN |

A Wilson Instruments' Rockwell Hardness tester, model 3JR, operated with a brale penetrator and a 60 Kg load was utilized to determine the Rockwell A Hardness. Hardness readings were taken on an unmounted sample of non-densified beta silicon nitride on the as-fired surface. Hardness measurements were taken in two locations on the test sample, with the following results, the average hardness was 59.5 RHA (Rockwell Hardness A).

| Location | Hardness |
| --- | --- |
| 1) | 61 RHA |

-continued

| Location | Hardness |
| --- | --- |
| 2) | 58 RHA |

X-Ray Diffraction Measurements

A sample of non-densified beta-silicon nitride was subjected to X-Ray diffraction measurements using a Siemens D500 TT diffractometer. Chromium K-alpha radiation obtained from a Chromium x-ray tube operated at 40KV and 30 MA was used to radiate the specimen. The specimen was mounted on the goniometer which had a diameter of 200 mm, the incident beam slit was set at 0.3 degrees, the detector slit set at 0.15 degrees, and a collection time of one second per step was utilized. The following data for the non-densified beta silicon nitride sample was obtained:

| Peak # | 2-theta | d-spacing | Relative Intensity |
| --- | --- | --- | --- |
| 1 | 35.171 | 3.7893 | 41.08 |
| 2 | 40.838 | 3.2816 | 100.00 |
| 3 | 51.103 | 2.6543 | 91.15 |
| 4 | 54.929 | 2.4824 | 84.98 |
| 5 | 59.564 | 2.3050 | 8.08 |
| 6 | 63.503 | 2.1756 | 28.09 |
| 7 | 74.190 | 1.8982 | 9.02 |
| 8 | 77.819 | 1.8228 | 9.67 |
| 9 | 81.747 | 1.7495 | 26.42 |
| 10 | 92.188 | 1.5890 | 12.59 |
| 11 | 95.620 | 1.5452 | 8.48 |
| 12 | 98.697 | 1.5090 | 13.94 |
| 13 | 103.987 | 1.4530 | 16.29 |
| 14 | 105.783 | 1.4356 | 6.01 |
| 15 | 117.409 | 1.3398 | 55.10 |
| 16 | 117.700 | 1.3378 | 28.59 |
| 17 | 118.854 | 1.3297 | 10.03 |

The diffraction peaks were compared to the JCPDS X-ray data filed for beta-phase silicon nitride and the peaks were an excellent match with negligible alpha-phase silicon nitride present.

Microstructure Measurements

Figure 2:
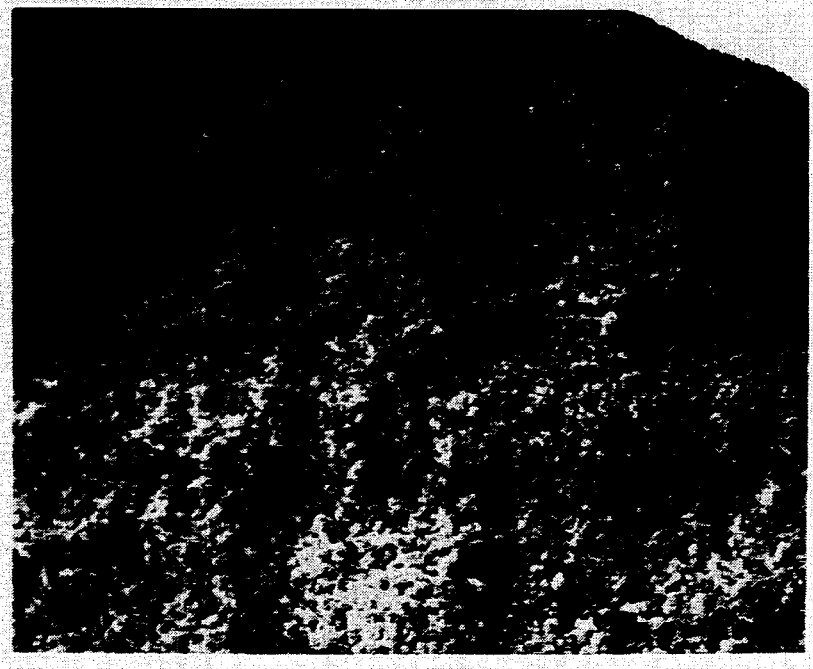
FIG. 2 is a photograph of a scanning electron microscopy (SEM) image of a fractured surface of the non-densified beta-phase silicon nitride of this invention at a magnification of 500×.
Figure 3:
FIG. 3 is a photograph of a scanning electron microscopy (SEM) image of a fractured surface of the non-densified beta-phase silicon nitride of this invention at a magnification of 1000×.
Figure 4:
FIG. 4 is a photograph of a scanning electron microscopy (SEM) image of a fractured surface of the non-densified beta-phase silicon nitride of this invention at a magnification of 5000×.

A sample of non-densified beta-silicon nitride was broken to generate a fresh fracture surface. The fracture surface was sputter-coated with gold-palladium and viewed using a Cambridge 360 scanning Electron Microscope, operated at 15KV, and a working distance of 15mm and using secondary electron imaging to reveal the microstructure of the sample. Photographs of the fractured surface microstructure were taken at magnifications of 100×, 500×, 1000×, and 5,000×, and are shown in FIGS. 1, 2, 3, 4, respectively. The microstructure is shown as a matrix of equiaxed beta silicon nitride grains ranging in size from 0.5 to 5 microns in diameter. The microstructure shows a fairly uniform dispersion of pores in the matrix which range in size from approximately one micron to 10 microns, with the majority appearing to be in the 2–4 micron in size.

While our invention has been described in terms of a few specific examples, it will be appreciated that other forms could readily be adapted by one skilled in the art. Accordingly, the scope of our invention is to be considered limited only by the following claims.

What is claimed is:

1. A silicon nitride beta-phase material comprising a structure of beta-phase silicon nitride crystals and at least one nitriding agent having a bulk density of less than about 3.2 g/cm$^3$, an apparent porosity of at least about 10%, and less than 10 weight percent alpha-phase silicon nitride without any significant amounts of densification aids made by
   (a) comminuting a slurry including a mixture consisting essentially of
       (i) silicon-containing powder,
       (ii) water, and
       (iii) at least one nitriding agent, said comminuting being performed to form non-oxidized surfaces on the silicon powder and to allow chemical reaction between the silicon and the water;
   (b) reducing the water content of the reacted slurry to a degree sufficient to form a resultant dry mass;
   (c) nitriding the dry mass by exposure to a nitriding gas including at least nitrogen to form a mass of substantially alpha-phase silicon nitride; and
   (d) converting the resultant silicon nitride mass at a conversion temperature of from about 1450° C. to about 2100° C. for a sufficient length of time to convert the silicon nitride from an alpha-phase material to a beta-phase material having at least one nitriding agent.

2. The silicon nitride beta-phase material of claim 1, wherein the at least one nitriding agent is selected from the group consisting of iron oxides, lead oxides, nickel carbonyl, nickel oxides, silicon carbide, graphite, carbon aluminum oxides, CoO, CaF, Li$_2$O, Na$_2$O, K$_2$O, BaO, BN, albite (NaAlSi$_3$O$_8$), orthclase (KAlSi$_3$O$_8$), anorthite (CaAl$_2$Si$_2$O$_8$), nepheline syenite, talc, borax, soda ash, alpha-phase Si$_3$N$_4$ and mixtures thereof.

3. A silicon nitride beta-phase material comprising a structure of beta-phase silicon nitride crystals having a bulk density of less than about 3.2 g/cm$^3$, less than 10 weight percent alpha-phase silicon nitride, and an apparent porosity of at least about 10% without any significant amounts of densification aids.

4. The silicon nitride beta-phase material of claim 3 having a bulk density of less than about 2.8 g/cm$^3$.

5. The silicon nitride beta-phase material of claim 3 having a hardness of at least 100 Knoop hardness number measured with a 500 gram load on a polished surface using a Tukon hardness tester.

6. The silicon nitride beta-phase material of claim 3 having a hardness of from about 400 to about 800 Knoop hardness number measured with a 500 gram load on a polished surface using a Tukon hardness tester.

7. The silicon nitride beta-phase material of claim 3 having a hardness of at least Rockwell A 20.

8. The silicon nitride beta-phase material of claim 3 having less than about 5 weight percent alpha-phase silicon nitride present.

9. The silicon nitride beta-phase material of claim 3 having equiaxed beta-phase silicon nitride grain size from about 0.1 to about 20 microns.

10. The silicon nitride beta-phase material of claim 3 having equiaxed beta-phase silicon nitride grain size from about 0.5 to about 5 microns.

11. The silicon nitride beta-phase material of claim 3 having pores from about 0.1 to about 50 microns in size.

12. The silicon nitride beta-phase material of claim 3 having pores from about 1 to about 10 microns in size.

13. The silicon nitride beta-phase material of claim 3 exhibiting not more than a 10,000 pounds per square inch decrease in hot flexure strength over about a 100° C. increase in test temperature.

14. The silicon nitride beta-phase material of claim 3 wherein liquid forming agents are present in less than 2 volume percent of the silicon nitride material.

15. The silicon nitride beta-phase material of claim 3 wherein liquid forming agents are present in less than 1 volume percent of the silicon nitride material.

16. The silicon nitride beta-phase material of claim 3 having at least 75% equiaxed beta-phase silicon nitride grains in size from about 0.1 to about 20 microns.

17. The silicon nitride beta-phase material of claim 3 having at least 50% equiaxed beta silicon nitride grains in size from about 0.1 to about 20 microns.

18. The silicon nitride beta-phase material of claim 3 wherein at least 75% of the pores are from about 0.1 to about 50 microns in size.

19. The silicon nitride beta-phase material of claim 3 wherein at least 50% of the pores are from about 0.1 to about 50 microns in size.

20. The silicon nitride beta-phase material of claim 3 wherein the material is in the form of a compacted article.

21. The silicon nitride beta-phase material of claim 1, wherein the converting step is conducted for at least 0.3 hours.

* * * * *